M. ELSAS.
HARROW.
APPLICATION FILED FEB. 13, 1913.
1,119,143.
Patented Dec. 1, 1914.
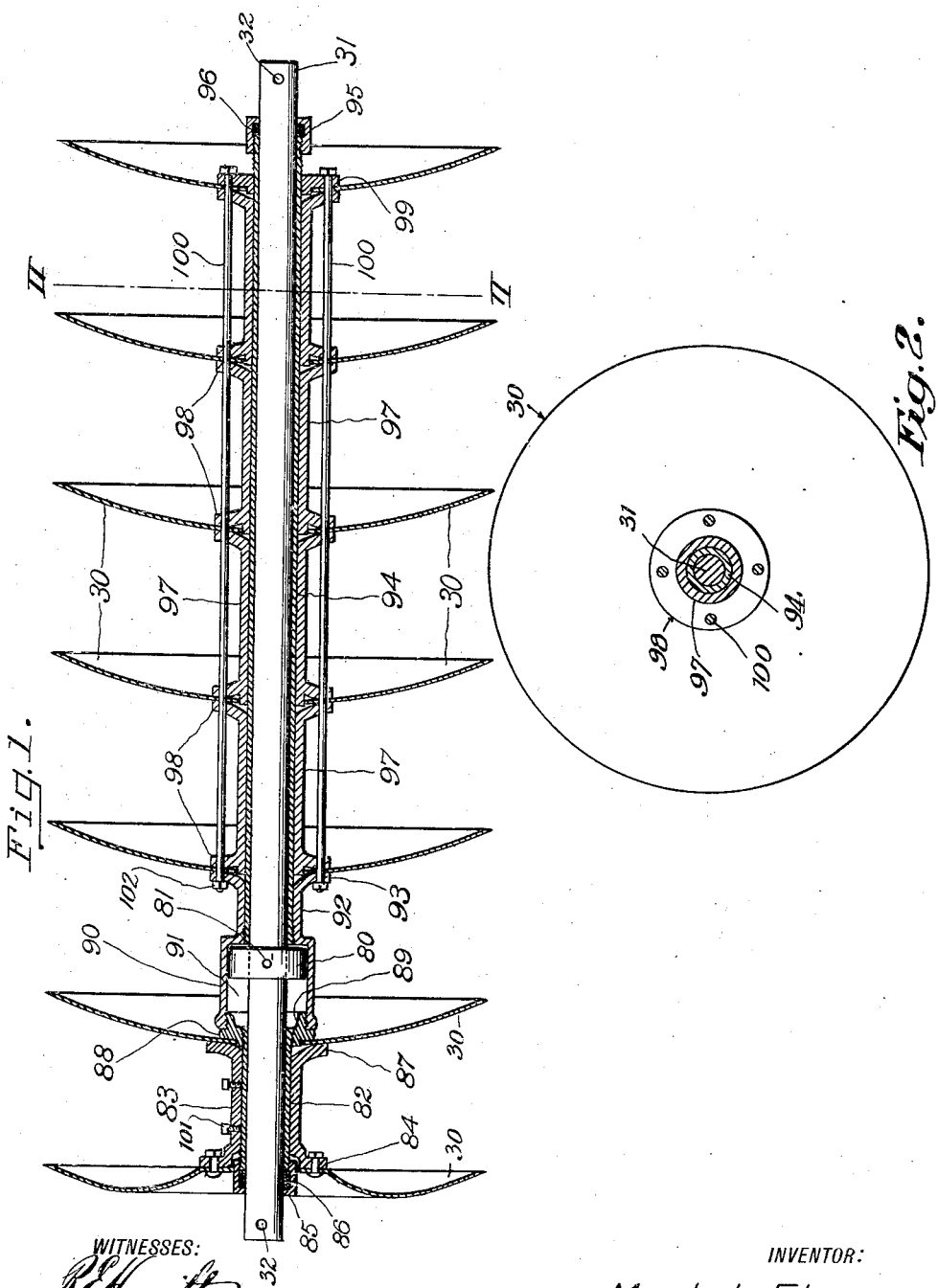
WITNESSES:
R. E. Hamilton
L. J. Fischer
INVENTOR:
Marshal Elsas,
BY F. G. Fischer,
ATTORNEY.

UNITED STATES PATENT OFFICE.

MARSHAL ELSAS, OF INDEPENDENCE, MISSOURI.

HARROW.

1,119,143. Specification of Letters Patent. Patented Dec. 1, 1914.

Application filed February 13, 1913. Serial No. 748,110.

*To all whom it may concern:*

Be it known that I, MARSHAL ELSAS, a citizen of the United States, residing at Independence, in the county of Jackson and State of Missouri, have invented certain new and useful Improvements in Harrows, of which the following is a specification.

My invention relates to improvements in disk harrows and disk cultivators, and one object of the invention is to provide novel means for lubricating the shaft or shafts upon which the disks or rotary cultivating appliances are mounted.

A further object is to provide means for preventing the escape of the oil and for excluding dust and other foreign matter from the shaft.

Other objects of the invention will hereinafter appear, and in order that said invention may be fully understood, reference will now be made to the accompanying drawing, in which:

Figure 1 is a vertical longitudinal section, showing the invention. Fig. 2 is a cross section on line II—II of Fig. 1.

In carrying out the invention, I employ a fixed shaft 31 having holes 32 at the ends thereof for the securement of a suitable draft mechanism thereto. Shaft 31 is provided with a thrust-collar 80 reliably secured thereto by a pin 81.

82 designates a short section of tubular lining journaled upon the shaft 31 at one side of the collar 80 and spaced a short distance therefrom.

94 designates a long section of tubular lining journaled upon the shaft 31 and arranged at the opposite side of the collar 80 to that on which the short section 82 is located.

90 designates a tubular oil-box loosely-encompassing the collar 80 and extending beyond one side thereof to form a lubricant chamber 91 for holding a supply of oil. One end of the oil-box 90 is internally threaded to receive an externally threaded cap 88, while the opposite end of said box has an integral hub 92 snugly embracing the adjacent end of the long section of lining 94, which is screwed into said hub.

The free end of hub 92 has an integral flange 93 which abuts a disk 30, a plurality of which are mounted upon a like number of spacing-sleeves 97, provided at their ends with flanges 98. Each disk 30 is secured between each pair of flanges 98. The disk 30 near one end of the lining 94, is secured between a flange 98 and the flange 93, while the disk near the opposite end of said lining 94 is secured between a flange 98 and a ring 99 loosely-mounted upon the lining. The disks 30 and the spacing sleeves 97 are firmly drawn together by bolts 100 which extend through holes in the ring 99 and the flange 93, and are provided with nuts 102.

Cap 88 is fitted upon the inner end of the short tubular section 82 and carries a disk 30 which is held thereon by the abutting flange 87 of a spacing sleeve 83, provided with a flange 84 at its opposite end which is bolted to a disk 30. The spacing sleeve 83 is secured to the short tubular section 82 through the intermediacy of set-screws 101.

The outer ends of the tubular linings 82 and 94 are threaded and provided with stuffing-boxes 85—95, containing packing 86 and 96, respectively. Said stuffing-boxes retain the lubricant within the tubular linings and exclude dust and other foreign matter therefrom. By removing the set-screws 101 from the spacing-sleeve 83 and the nuts 102 from the bolts 100 the disks 30 and the spacing sleeves may be removed.

While I have shown and described the preferred form of my invention, it is understood that the invention is not limited to the specific form and construction of the details disclosed, but is susceptible of various alterations in the scope of the appended claim.

Having thus described my invention, what I claim and desire to secure by Letters Patent is:

In a harrow, a fixed shaft, tubular lining journaled upon said shaft and adapted to contain oil, stuffing-boxes encompassing the ends of said tubular lining, cultivating appliances encompassing said tubular lining and arranged to rotate therewith, a thrust-collar secured to the shaft, and an oil box loosely-embracing said thrust-collar and arranged to rotate with the cultivating appliances.

In testimony whereof I affix my signature, in the presence of two witnesses.

MARSHAL ELSAS.

Witnesses:
S. ELSAS,
F. G. FISCHER.

Copies of this patent may be obtained for five cents each, by addressing the "Commissioner of Patents, Washington, D. C."